United States Patent [19]

Brooks et al.

[11] Patent Number: 5,371,136
[45] Date of Patent: Dec. 6, 1994

[54] HIGH ADHESION COATING FOR RUBBER ARTICLES

[75] Inventors: Howard L. Brooks, Sylvania, Ohio; George M. Hart, Adrian, Mich.; Jaimini R. Vora, Sylvania, Ohio

[73] Assignee: Wacker Silicones Corporation, Adrian, Mich.

[21] Appl. No.: 43,066

[22] Filed: Apr. 5, 1993

Related U.S. Application Data

[62] Division of Ser. No. 928,162, Aug. 12, 1992, Pat. No. 5,234,988.

[51] Int. Cl.5 .............................................. C08L 19/00
[52] U.S. Cl. ................................... 524/526; 524/270; 524/271; 427/393.5
[58] Field of Search ............... 524/526, 270, 271; 427/393.5

[56] References Cited

U.S. PATENT DOCUMENTS

| | | | |
|---|---|---|---|
| 4,213,888 | 7/1988 | Karg et al. | 524/556 |
| 4,463,120 | 7/1984 | Collins et al. | 524/274 |
| 5,066,703 | 11/1991 | Hart et al. | 524/437 |
| 5,182,142 | 1/1993 | Hart et al. | 427/393.5 |

*Primary Examiner*—Paul R. Michl
*Assistant Examiner*—John J. Guarriello
*Attorney, Agent, or Firm*—Martin Connaughton

[57] ABSTRACT

The invention provides a water based mixture of a rubber latex and a resin emulsion containing ground rubber which provides a high adhesion coating having excellent air bleed when coated on an uncured rubber article which is thereafter cured or vulcanized.

7 Claims, No Drawings

HIGH ADHESION COATING FOR RUBBER ARTICLES

This application is a division of application Ser. No. 07/928,162, filed Aug. 12, 1992, now U.S. Pat. No. 5,234,988.

FIELD OF THE INVENTION

This invention relates to a coating which has high air bleed during cure and high adhesion to rubber following cure, particularly the sidewalls, tread, veneer, and carcass of a tire. This makes the high adhesion compositions of the invention extremely suitable for use as an adhesive or a top coat or finishing coat for rubber objects and, more particularly, as an outside tire paint to be applied before curing or vulcanizing.

BACKGROUND OF THE INVENTION

Generally, the molding of rubber articles, particularly tire carcasses, requires that a composition be applied on either the sidewall or the entire outside of the uncured article before it is placed into a mold for cure. While such compositions facilitate mold release and improve molding characteristics, their main function is to act as an air venting medium for entrapped air and thus reduce the blemishes which can form on the outside surface during curing. For example, if air is trapped between the wall of a tire and the mold during curing and shaping, an air bubble blemish is cured into the tire. The air bubble appears as a depression in the tire sidewall.

Currently, coatings which provide high adhesion performance together with adequate venting when applied to rubber articles prior to molding and curing are based on low flash hydrocarbon solvents containing as little as 5-10% solids. Such low flash, high volume solvent compositions release a large amount of solvent to the atmosphere during application (usually by spraying) and vulcanization. Objections have been raised by OSHA (Occupational Safety and Health Act) against such solvent based products due to the hazardous atmosphere created during application, leading to labor problems relating to the handling of such low flash, high volume solvent products. Such compositions also create a fire hazard.

Moreover, low boiling solvent coating compositions currently used contain 5-10% carbon black in suspension along with a substantially lesser amount of dissolved rubber. The solvent in such compositions evaporates quickly when the composition is sprayed on the outside surface of an uncured tire, leaving a thin surface film of carbon black and rubber that becomes tightly bound to the rubber after curing or vulcanization. In such solvent-based compositions, the high carbon black loading needed to improve air venting often causes inadequate adhesion. This is particularly troublesome because good adhesion is critical for tire substrates having tread over sidewall type construction.

Another drawback of solvent based compositions is that they are typically not stable on storage and must be used within a relatively short period of time after being prepared. For this reason, they are typically made in-house by the user.

On the other hand, while water based compositions currently on the market containing both carbon black and mineral fillers together with rubber latex binders provide adequate air venting, they have almost no adhesive properties. Water based compositions tailored to provide adequate adhesion do not provide adequate air bleed characteristics.

In order to provide a coating for rubber articles devoid of the disadvantages of prior coatings, a water based composition that is compatible with and effectively adherent to rubber surfaces while permitting relatively short drying times with adequate air bleed characteristics on curing is desirable. Such a coating must eliminate blemishes such as folds, unfilled voids, knit failures and cracks on the surface without flaking or leaving a residue on mold surfaces. They must have adequate storage and handling stability and have no deleterious effect on the weatherability and aging characteristics of the cured rubber article.

SUMMARY OF THE INVENTION

A coating composition for rubber articles having high adhesion and satisfactory air bleed during cure is provided which comprises a water based mixture of a rubber latex and a resin emulsion containing an effective amount of ground rubber to provide the air bleed. Because the compositions of the invention provide excellent adhesion and satisfactory air bleed during cure, they effectively eliminate the problem of poor adhesion heretofore associated with water based compositions having sufficiently high filler loading to provide adequate air venting.

Further, the coatings of the invention adhere with unexpected strength when applied to a rubber substrate, such as a tire, which is then cured, even though the ground rubber does not function as a high adhesion material individually. In combination in the coatings of the invention, however, the ground rubber/rubber latex/resin emulsion components, when applied to rubber substrates before curing, impart good molding characteristics with effective air bleed and defect free products devoid of unfilled voids, knit failures and surface cracks while at the same time strongly adhering to the cured rubber substrates.

The coating compositions of the invention are so strongly adherent when properly cured that they are also particularly useful as bonding adhesives as well as surface coatings. Although the compositions of the invention exhibit no useful degree of room temperature tack (often called "building tack") as might be expected of an adhesive as such, they nevertheless function as useful adhesives and do not trap air in cured bond junctions.

The advantages of the invention are obtained in a preferred embodiment in which the water based compositions of the invention contain from about 4 to about 60 weight percent of ground rubber, from about 0.5 to about 15 weight percent of rubber latex and from about 1 to about 30 weight percent of resin emulsion, it being understood that the rubber latex and resin emulsion need not be present in equal quantities. Generally, the composition contains from about 30 to about 85 weight percent of water and from about 15 to about 70 weight percent solids.

Preferably, a composition of the invention also contains a tack enhancer, wetting agent, thickening agent, surfactant, and biocide/preservative. A colorant, shear stabilizer, foam control agent, sequestering agent, or any other suitable additive may be used as desired, including wetting agents and fillers.

The invention also encompasses a process for molding rubber articles substantially free of surface defects which comprises coating the outer surface of an uncured rubber article with an aqueous composition containing ground rubber in admixture with a mixture of a rubber latex and resin emulsion, and thereafter curing or vulcanizing the coated rubber article. Preferably, the rubber article is cured in a mold under suitable curing conditions.

Finally, the invention encompasses a process for adhering or bonding rubber surfaces which comprises coating at least one of the surfaces to be bonded with an aqueous composition containing ground rubber in admixture with a mixture of a rubber latex and resin emulsion, placing the coated surface together with the surface to which it is to be adhered, and heating/curing/vulcanizing to cure the adhesive bond. Preferably, the coated surface(s) is allowed to dry before it is adhered.

DETAILED DESCRIPTION OF THE INVENTION

In the following discussion, the parts and percentages of the components contained in the coating compositions of the invention are by weight based on the total weight of the composition unless otherwise indicated.

The coating compositions of the invention can be applied to any rubber substrate to be cured, particularly tire sidewalls, tread, veneer, carcass and the like. The substrate can be any natural or synthetic rubber or combination. Generally, the substrate can be any saturated or unsaturated polyalkylene rubber substrate made up of ethylene, one or more alpha-alkenes with 3–8 carbon atoms, for instance, propylene and/or 1-butene, and, if desired, one or more polyethylenically unsaturated compounds with non-conjugated double bonds, for instance, 1,4-hexadiene, dicyclopentadiene, 5-methylene-2-norbornene, 5-ethylidene-2-norbornene and 5-isopropylidene-2-norbornene. These rubbers are generally prepared using metalorganic catalyst systems known as the Ziegler-Natta catalysts, in solution or dispersion at temperatures in the range of $-30$ degrees to $+100$ degrees C. Polyalkylene rubbers containing 30 to 90 weight % of ethylene, 10 to 70 weight % of one or more alpha alkenes with 3 to 8 carbon atoms and, if desired, 0.3 to 15 weight % of one or more compounds with non-conjugated, ethylenically unsaturated C—C bonds.

The rubber substrate can therefore be any suitable natural rubber, synthetic polyisoprene, styrene-butadiene rubber, butyl rubber, bromobutyl rubber, chlorobutyl rubber, any of the neoprenes, ethylene propylene rubbers, nitrile elastomers, polyacrylic rubber, polysulfide polymers, silicone elastomers, poly and copolyesters, high molecular weight styrene resins, ethylene acrylic elastomers, vinyl acetate ethylene copolymers, chlorinated or chlorosulfonated polyethylenes, and the like and mixtures thereof.

The rubber substrate can be a polyalkylene rubber mixed with one or more oligomers or polymers of alpha alkenes, or any of the usual additives such as oil, carbon black, and/or other fillers, zinc oxide, stearic acid, and the like.

The surface of the article to be coated can be pretreated as desired, for example, with an oxidizing agent or by UV-radiation, and then the coating composition can be applied by any suitable method such as brushing, spraying, dipping, rolling, and so on.

The ground rubber filler of the invention can be prepared from any suitable vulcanized or unvulcanized rubber or mixture thereof which can be ground in any suitable manner under any suitable conditions, crogenically or ambiently. The ground rubber can be obtained by grinding cured or uncured rubber articles such as old or off-specification tires, wiper blades, or any other rubber materials available including the substrate materials described above. Articles high in natural rubber content are preferred. Preferably, the rubber is ground to a particle size of about 50 millimicrons or greater, preferably from about 5 to about 400 microns, most preferably from about 20 to about 200 microns. It may be necessary to grind the particles several times. The amount of the ground rubber filler in the coating composition of the invention generally ranges from about 4 to about 60 weight percent and more preferably from about 5 to 40 weight percent.

A separating agent can be used to keep the rubber particles separate, expecialy in high humidity. Generally up to about 2 weight % of any suitable separating agent such as finely divided fillers, preferably talcs, carbon blacks, zinc stearate, calcium carbonate and the like can be used for this purpose.

A coating composition of the invention preferably contains a volume ratio of ground rubber filler to binder (rubber latex and resin emulsion) of from about 2.5 to 1 to about 7.0 to 1. Generally, a specific filler content can be established mathematically depending on the relative air bleed requirements needed to mold blemish-free rubber articles. For example, relative air bleed capabilities can be calculated as the total volume of filler in the composition divided by the total volume of binders, with higher values signifying higher air bleeds. Actual air bleed is best demonstrated by success in the curing of blemish-free molded rubber articles under actual manufacturing conditions.

The binder of the coating composition comprises a rubber latex and a resin emulsion which can either be mixed together or added separately at any time before the composition is completed. The rubber latex component of the binder of the invention can be any aqueous latex which contains from about 15 up to about 80% by weight and preferably from about 30 to about 70% by weight of natural or synthetic rubber particles. "Rubber" as used herein can be defined using ASTM standard ASTM-D 1566-62T, 1964, Part 28, p. 801. While certain synthetic rubbers can add both binding ability and oxidation resistance, it is generally preferred to use an all or substantially all natural rubber latex since natural rubber gives better adhesion properties when formulated with the resin dispersions of the invention.

If a synthetic rubber is to be used, it should be compatible or miscible with the rubber of the substrate to be coated and capable of being formulated into a free flowing liquid coating composition which will not easily settle. Some suitable synthetic materials include, for example, neoprene (polychloroprene), styrene-butadiene rubbers (SBR), acrylonitrile-butadiene rubbers (NBR), high molecular weight olefin polymers with or without other monomers or polymers such as butyl rubber and cis and trans polybutadienes. Other synthetic materials are more fully set out in Volume 7, pp 676–716 of Kirk-Othmer, *Encyclopedia of Chemical Technology*, 1966, incorporated herein by reference. Other natural rubbers are more fully set out in Volume 17, pp 660–682, Kirk-Othmer, *Encyclopedia of Chemical Technology*, 1966, incorporated herein by reference.

The rubber latex employed in the invention should contain from 15–85 weight %, preferably 30–70 weight % of natural or synthetic rubber or combination thereof. The amount of rubber contributed by the rubber latex component of the coating composition of the invention should generally range from about 0.3 to about 8 weight %, preferably 1–5 weight %. The amount of the rubber latex in the coating composition of the invention ranges from about 0.5–15 weight %.

Preferred are latexes of 1,3-butadiene, 2 methyl homopolymer, styrene butadiene, polyisoprene, or any other suitable natural or synthetic rubber or mixture thereof. Natural rubber latexes are preferred.

Some preferred commercially available rubber latexes include Hartex 103 available from Firestone Synthetic Rubber & Latex Co., Akron, Ohio; Polysar PL-403 available from Polysar Latex, Chattanooga, Tenn.; Pliolite 5356 and GNL-150 Latex available from Goodyear Tire & Rubber Company, Akron, Ohio; and the like and mixtures thereof.

The resin emulsion employed in the invention should contain from about 15–85 weight %, preferably from about 30–70 weight % of natural or synthetic lower aliphatic hydrocarbons, e.g., having from 2–20 carbon atoms, or combination thereof.

The amount of rubber solids contributed by the resin emulsion of the coating composition of the invention should generally range from about 0.3 to about 15 weight %, preferably 1–8 weight %. The amount of the resin emulsion in the coating composition of the invention ranges from about 1–30 weight %.

The resin emulsion component of the binder of the invention is preferably a dispersion of paraffin oils or petroleum aliphatic resins. Particularly suitable are anionic dispersions having about a 55% solids content of low molecular weight aliphatic hydrocarbon resins derived mainly from dienes and other reactive olefin monomers, having a viscosity at 25 degrees C. of about 1,000–1,500 cps, particularly 1,250, and an average resin particle size of less than about 1 micron.

Another preferred resin emulsion is an anionic aqueous dispersion having about a 55% solids content of the hydrogenated methyl ester of rosin, having a viscosity at 25 degrees C. of about 1,500 cps, and an average resin particle size of less than 1 micron. Still another preferred resin emulsion is an anionic aqueous dispersion having about a 55% solids content of a light colored aliphatic hydrocarbon resin having a viscosity at 25 degrees C. of about 800 cps and an average particle size of less than about 1 micron. Yet another preferred resin emulsion is an anionic aqueous dispersion having about a 55% solids content of an alkaryl hydrocarbon resin having a viscosity at 25 degrees C. of about 3,000 cps and an average resin particle size of less than about 1 micron.

Any other suitable aqueous dispersion of a lower molecular weight aliphatic hydrocarbon resin or mixtures thereof can also be employed. Some preferred commercially available resin emulsions include Piccopale 85-55WKX, Foral 85-55WKX, Hercolyn D-55 WKX, Piccotac 95-55WK, Picovar AP25-55 WKX, and Staybelite Ester 10-55WKX, all available from Hercules Incorporated, Resins Group, Hercules Plaza, Wilmington, Del. 19894, and the like and mixtures thereof.

Any suitable tack enhancer can be used in the compositions of the invention. Generally, from about 0.05 to about 2% is preferred. A tack enhancer is useful in extending the performance capabilities of compositions of the invention, allowing increased amounts of ground rubber to be used thereby making it possible to substantially double air bleed effectiveness without impairing adhesion performance. A preferred tack enhancer is N-ethyl-N-hydroxy ethanamine.

Any suitable thickening agent can be used in the coating compositions of the invention to aid in keeping the ground rubber filler in suspension. Generally, up to about 40 weight % can be used, preferably from about 0.1 to about 20 weight % of thickening agent is employed. Examples of some suitable thickening agents which can be used include polyacrylic acids, sodium carboxymethyl cellulose, xanthan gum, bentonite, starch, synthetic gums, water soluble cellulose derivatives such as hydroxyethylcellulose, methylcellulose, methylhydroxypropylcellulose, ethylhydroxyethylcellulose, methylethylcellulose, methylhydroxyethylcellulose, and the like and mixtures thereof. Xanthan gum, carboxypolymethylene, and acrylic acid polymers having an average molecular weight of from about 2,000,000 to about 50,000,000, including copolymers, are particularly preferred. In the case of polyacrylic acid thickeners, an effective amount of caustic or any other suitable base is added to neutralize the acidity and activate thickening properties.

Any surfactant can be employed as such and/or as a dispersing and/or wetting agent in preferred embodiments of the invention. Such compounds reduce surface tension when dissolved in water or water solutions, or reduce interfacial tensions between two liquids, or between a liquid and a solid (surfactant) or promote uniform and maximum separation of extremely fine solid particles, often of colloidal size (dispersing agent) or cause the water to penetrate more easily into or spread over the surface of another material by reducing the surface tension of the water (wetting agent). Generally, from about 0.01 to about 5.0 weight %, preferably from about 0.3 to about 3 weight % of these constituents is employed for each use.

Some suitable materials from which the surfactant, dispersing agent, wetting agent and the like may be chosen in the practice of the invention include any suitable anionic surfactant and certain nonionic surfactants. Some suitable anionic surfactants which can be employed include, for example, amine dodecyl benzene sulfonate, sodium alkylaryl polyether sulfonates, alkyl ether sulfates, alkyl sulfoacetates, partial salts of phosphate esters of an ethylene oxide adduct of nonyl phenol containing 4 to 15 ethylene oxide radicals per molecule and the like and mixtures thereof.

Suitable nonionic surfactants which can be employed include, for example, the condensation products of higher fatty alcohols with ethylene oxide such as reaction products of oleyl alcohol with 10 ethylene oxide units, condensation products of alkylphenols and ethylene oxide such as the reaction products of isooctylphenol with 12 ethylene oxide units, condensation products of higher fatty acid amides with 5 or more ethylene oxide units and the like and mixtures thereof. Amine dodecylbenzene sulfonate, sodium carbonate, and oleic acid are preferred as surfactants, dispersing agents and/or wetting agents.

Any suitable biocide and/or preservative can be used in the coating compositions of the invention. Generally, from about 0.05 to about 2 weight %, preferably from about 0.15 to about 0.5 weight % of the biocide and/or preservative is employed. Some suitable biocide/preservative materials which can be used include, for example, 1,2-benzisothiazolin-3-one, 1,2-dibromo-2,4-dicyano-butane, 10,10-oxybisphenoxyarsine, 6-acetoxy- 2,4-dimethyl-1,3-dioxane, 3,5-dimethyltetrahydro-1,3,5,2H-thiadiazine-2-thione, and the like and mixtures thereof. Preferably, 1,2-benzisothiazolin-3-one and 3,5-dimethyltetrahydro-1,2,5,2H-thiadiazine-2-thione and mixtures thereof are used.

It is also helpful to include sequestering agents in compositions of the invention to sequester ions present or liberated from the ground rubber filler and maintain a stable coating composition. Preferred are EDTA/polyacrylic acid type additives and powdered sodium salts of polyacrylates known as GOODRITE K-700 high performance polymers, especially K-7058D manufactured by B.F. Goodrich Company, Specialty Polymers & Chemicals Division, Cleveland, Ohio 44131. Generally, from about 0.03 to about 6 weight percent, preferably from about 0.1 to about 3 weight percent of the sequestering agent is employed.

Other elements which can be used in the compositions of this invention to enhance their performance include colorants, foam control agents, shear and other stabilizers and the like and mixtures of any of them. Although any suitable constituents may be employed in any suitable quantity, preferred constituents which enhance the unexpected advantages of the invention include a 10 to 50% water dispersion of finely divided carbon black as colorant, preferably in amounts ranging from about 0.1 to about 2 weight percent; dimethylpolysiloxane emulsions and hydrophobed silica with mineral oil as foam control agents, preferably in amounts ranging from about 0.01 to about 0.4 weight percent; N-ethyl-N-hydroxyethanamine as a tack enhancer, preferably in amounts ranging from about 0.05 to about 2 weight percent; ammonium caseinate and sodium lauryl sulfate in any suitable amount as emulsion stabilizers and shear and other stabilizers known in the art.

Any suitable filler known in the art can also be used such as, for example, lampblack, hydrous magnesium silicate, carbon black, mica, talc, aqueous silica, sodium fluoroaluminate and the like and mixtures thereof. Unsaturated compounds, rubber latexes, curing agents and other expedients known in the art can also be added to improve adhesion at high temperatures if desired.

The coating compositions of the invention can be applied to substrates by any conventional coating method such as by dipping, roll coating, spraying, and the like. The coatings are preferably sprayed using any suitable paint spray type equipment, generally at a spray rate sufficient to apply the desired quantity of coating for the desired application, preferably 0.003 to 0.02 grams, more preferably 0.004 to 0.008 grams dry weight per square inch of substrate surface. The preferred ranges are dictated by the requirement that enough coating be present to provide adequate air bleed without using so much that adhesion is lost. The amount of coating applied to a rubber surface may be varied although the amount generally applied would correspond to that amount applied when the raw rubber surface is given a thin coating with a paint brush. The raw rubber article is then shaped and cured.

When a composition of the invention is applied to the surface of a tire to be shaped and cured, it remains on the tire surface as an outside tire paint. Enhanced results are obtained when compositions of the invention are applied to fabric-backed substrates, probably because the fabric backing acts as a stabilizer to prevent possible junction bond distortion and prevent tearing adhesion failure.

When used as an adhesive, the compositions of the invention need only be applied to one of the surfaces to be adhered before the surfaces are placed together and cured or vulcanized as discussed above.

The coatings of the invention permit the flow of air from the outside surface of the rubber article, such as a tire, as it is compressed and heated against the metal wall of the mold for shaping and curing. Otherwise, air can be trapped between the outside wall of the tire and the mold. An air bubble can be cured into the tire as a result and appear as a depression in the tire sidewall. Other imperfections which may come from lack of lubrication causing the displacement of the tire wall from the metal during curing causing the wall not to be smooth are obviated when coatings of the invention are used.

The invention will be described in greater detail by reference to the following examples in which all parts and percentages are by weight unless otherwise indicated.

EXAMPLE 1

Preparation of Starting Materials

Sidewall rubber is milled in a 2-roll rubber mill typically used for that application with a relatively closed roll-to-roll spacing (e.g., ⅛ inch gap) using enough rubber compound to provide for a continuous band of rubber on one roll plus a modest reserve (bank) of rubber on top between the rolls. The milling is continued for about 5 to 10 minutes until the rubber is softened and smooth. Once the rubber is sufficiently softened, the mill is opened to the desired mark predetermined to give finished slabs of the desired thickness, (3/16 inch). At this gap setting the rubber then is removed from the mill in a relatively uniform sheet. The sheet so obtained is cut into four sections measuring about five by six inches apiece. The actual final size of each slab is dependant upon whether it is to be used with or without fabric backing. If the slab is to be used without fabric backing, it is adjusted to weigh between 110 to 125 grams. If the slab is to be used with fabric backing, it is adjusted to weigh between 75 and 90 grams.

The ground rubber is prepared by grinding and classifying cured and/or uncured bulk rubber materials to a suitable particle size by any of several existing commercial processes (e.g., dry grinding, wet slurry grinding, cryogenic grinding, etc.) or any other suitable means.

A first coating composition is prepared by mixing about 277.3 parts of deionized water, about 2.6 parts of amine dodecylbenzene sulfonate, about 37 parts of ground rubber made by grinding Aamco windshield wiper stock to 80–100 mesh (Midwest Elastomers, Inc., Wapakoneta, Ohio, 45895, grade ME 80/100), about 4.8 parts of 12% colloidal silica dispersion, about 2.4 parts of 15% ammoniun caseinate, about 0.4 parts of 50% caustic (NaOH) solution, about 1.7 parts of xanthan gum as a thickener, about 0.2 parts of 29% sodium lauryl sulfate solution, about 40.7 parts of a natural rubber latex of 1,3-butadiene, 2 methyl homopolymer having a molecular weight ranging from about 200,000 to about 500,000, a pH of about 9.8 and a total solids content of about 62% (Hartex 103. Firestone Synthetic Rubber & Latex Co., Akron, Ohio, 44301, Lot #686), about 13.8 parts of SBR latex, about 1.43 parts of oleic acid, about 0.3 parts of 1,2-benzisothiazoline-3-one as a biocide/preservative and about 0.07 part of a 12% polydimethylsiloxane foam control agent. The air bleed properties of this composition are calculated to be 0.98 to 1.

A second coating composition is prepared by mixing about 590 parts of deionized water, about 1.5 parts of amine dodecylbenzene sulfonate, about 91.5 parts of the same ground rubber used in the first coating, about 102 parts of a 55% solids, solvent-free anionic dispersion of a low molecular weight, aliphatic hydrocarbon resin derived mainly from dienes and reactive monomers having a viscosity at 25 degrees C. of 1,250 cps and a resin particle size of less than 1 micron (Piccopale 85-55 WKX from Hercules Inc., Resins Group, Wilmington, Del. 19894, Lot #8EBA277) and about 2.5 parts of xanthan gum. The air bleed properties of this composition are calculated to be 1.27 to 1.

A third coating composition is prepared by mixing about 57.5 parts of deionized water, about 100 parts of a natural rubber latex of 1,3-butadiene, 2 methyl homopolymer having a molecular weight ranging from about 200,000 to about 500,000, a pH of about 9.8 and a total solids content of about 62% (as used in first coating composition), about 60 parts of a 55% solids, solvent-free anoinic dispersion of a low molecular weight aliphatic hydrocarbon resin derived mainly from from dienes and reactive monomers having a viscosity at 25 degrees C. of 1,250 cps and a resin particle of less than 1 micron (as used in the second coating composition). This composition possesses no air bleed properties calculated as above.

A fourth coating composition is prepared by mixing about 590 parts of deionized water, about 7.5 parts of amine dodecylbenzene sulfonate, about 61.5 parts of a natural rubber latex of 1,3-butadiene, 2 methyl homopolymer having a molecular weight ranging from about 200,000 to about 500,000, a pH of about 9.8 and a total solids content of about 62% (as used in the first coating composition), about 37 parts of a 55% solids, solvent-free anionic dispersion of a low molecular weight, aliphatic hydrocarbon resin derived mainly from dienes and reactive olefin monomers having a viscosity at 25 degrees C. of 1,250 cps and a resin particle of less than 1 micron (as used in the second coating composition), and about 129 parts of lampblack as a filler/substitute for ground rubber. The air bleed properties of this composition are calculated to be 1.06 to 1.

A fifth coating composition is prepared by mixing about 31.6 parts of deionized water, about 1.5 parts of amine dodecylbenzene sulfonate, about 91.5 parts of the ground rubber of the first coating composition, about 28.6 parts of a natural latex of 1,3-butadiene, 2 methyl homopolymer having a molecular weight ranging from about 200,000 to about 500,000, a pH of about 9.8 and a total solids content of about 62% (as used in the first coating composition), about 72.8 parts of a 55% solids, solvent-free anionic dispersion of a low molecular weight, aliphatic hydrocarbon resin derived mainly from dienes and reactive olefin monomers having a viscosity at 25 degrees C. of 1,250 cps and a resin particle size of less than 1 micron (as used in the second coating composition), and about 3.5 parts of xanthan gum. The air bleed properties of this composition are calculated to be 1.33 to 1.

A sixth coating composition is prepared by mixing about 9312.5 parts of deionized water, about 199.2 parts of amine dodecylbenzene sulfonate, about 2029.3 parts of a 1.7 % solution of a polyacrylic acid thickener (MW=1,250,000), about 91.3 parts of a 51% solution of the sodium salt of a polyacrylate sequestering agent, about 3084 parts of 120 mesh ground rubber (Rouse Rubber Co., Vicksburg, Miss., 39181, GF-120 Lot #127), about 228 parts of 58% ammonium hydroxide solution, about 9.2 parts of a 12% dimethylpolysiloxane foam control agent, about 1604.9 parts a natural latex of 1,3-butadiene, 2 methyl homopolymer having a molecular weight ranging from about 200,000 to about 500,000, a pH of about 9.8 and a total solids content of about 62% (Hartex 103, Lot #114), about 1750.0 parts of a 55% solids, solvent-free anionic dispersion of a low molecular weight, aliphatic hydrocarbon resin derived mainly from dienes and reactive monomers having a viscosity at 25 degrees C. of 1,250 cps and a resin particle size of less than 1 micron (Piccopale 85-55WKX, Lot #9EB2105), about 162.6 parts of a 20% water dispersion of lampblack, about 50.7 parts of a 50% solution of 1,2-benziosthiazoline-3-one as a biocide/preservative, about 238.0 parts of a 15% solution of ammonium caseinate, about 7.1 parts of a 29% solution of sodium lauryl sulfate, about 9.3 parts of 50% sodium hydroxide solution and about 78.6 parts of oleic acid. The air bleed properties of this composition are calculated to be 1.12 to 1.

A seventh coating composition is prepared by mixing about 493.8 parts of deionized water, about 7.5 parts of amine dodecylbenzene sulfonate, about 190.8 parts of the same ground rubber used in the sixth coating composition, about 2.5 parts of a powdered sodium salt of a polyacrylate sequestering agent, about 80.4 parts of a 1.7% solution of a polyacrylic acid thickener (MW=1,250,000), about 2.7 parts of N-ethyl-N-hydroxyethanamine as a tack enhancer, about 3.0 parts of a 20% water dispersion of lampblack, about 6.4 parts of a 58% solution of ammonium hydroxide, about 36.5 parts of a natural latex of 1,3-butadiene, 2 methyl homopolymer having a molecular weight ranging from about 200,000 to about 500,000, a pH of about 9.8 and a total solids content of about 62% (GNL 150, Goodyear Tire & Rubber Co., Akron, Ohio, 44316, Lot #387), about 23.7 parts of a 55% solids, solvent-free anionic dispersion of a low molecular weight, aliphatic hydrocarbon resin derived mainly from dienes and reactive olefin monomers having a viscosity at 25 degrees C. of 1,250 cps and a resin particle size of less than 1 micron (Piccopale 85-55 WKX, Hercules Inc., Resins Group, Wilmington, Del., 19894, Lot #REF 3127), about 1.5 parts of 1,2-benzisothiazoline-3-one as a biocide/preservative, about 0.3 parts of a 12% dimethylpolysiloxane foam control agent and 0.8 parts of 3,5-dimethyltetra hydro-1,3,5,2H thiadiazine-2-thione as a biocide/preservative. The air bleed properties of this composition are calculated to be 3.49 to 1.

The above coating compositions all contain from about 20 to about 30% solids.

EXAMPLE 2

Preparation of Coated Samples

The above-described compositions are sprayed onto one smooth side of rubber slabs prepared as described in Example 1 using commercially available paint spray equipment fitted with about 0.025 to 0.1 inch fluid nozzles to apply an even coating weight of from about 0.003 to about 0.01 grams per square inch (determined after the coating has been allowed to dry for about one hour). Dry coating weights of about 0.003, 0.008, 0.007, 0.006, 0.005, 0.004 and 0.006 gram per square inch are obtained for compositions 1-7, respectively.

For each slab, a 5×6×0.002 inch Mylar sheet is prepared into which three 1×3 inch windows are cut, evenly spaced across the 6-inch dimension so that a 1.5 inch margin remains above and a 0.5 inch margin remains below the windows with a 0.5 inch margin on each side. The Mylar sheet is placed on an uncoated sidewall slab so that the 5×6 inch dimensions of each coincide. The slab containing the Mylar sheet is then mated with a coated sidewall slab. The Mylar sheet provides windows which define areas in which adhesive bonding can occur between the mated slabs.

If fabric stock is to be used as backing (see below), it is applied to the side of the rubber slab which is not mated to a second rubber slab. The dimensions of the fabric stock should be about 6.6×6 inches with the fabric strands parallel along the 6.6-inch dimension. The fabric stock is aligned on the rubber slab so that (1) the 6-inch dimensions of both pieces coincide (i.e., the strands of the fabric stock are parallel to the 5-inch dimension of the rubber slabs, and (2) a 6-inch edge of the fabric stock is even with a corresponding edge of the rubber slab. The fabric stock which extends beyond the edge of the rubber slab is wrapped over that edge to the other side so that it extends about 1.3 inches down the opposite side of the rubber slab. The inch margin of the Mylar Window Sheet (above) is positioned to coincide with the edge of the rubber slab with the fabric stock wrapped over it. This extra fabric stock reinforces the test specimens where they are clamped in the jaws of the peel tester.

The fabric stock backing for the assembled test slabs reinforces and stabilizes the dimensions of the bond joints during peel testing, i.e., prevents elongation and narrowing of the bond area under tension. This provides somewhat improved apparent adhesion performance for a given composition over samples having no fabric backing.

The total weight of the mated sidewall pieces is between about 220 and about 250 grams.

EXAMPLE 3

Curing of Coated Samples

A Wabash automatic hydraulic press with 22 inch×18 inch heated platens is preheated to a temperature of about 340 degrees F. A mold which simulates tire molding conditions with a curing press that provides only clamping force and heating while pressure needed for curing is provided by superheated steam or compressed nitrogen at about 150 psig is preheated at about 340 degrees F. for 15 minutes. The preheated mold is opened, and one mated sidewall assembly of rubber to be tested is placed in each of the two cavities of the mold. The mold is assembled and placed into a press which is then closed and adjusted to apply a closing force of about 5 tons to clamp and seal the mold. The mold is then hooked to a pressurizing gas line. While the vent valve is off, the pressurizing gas is turned on slowly to about 150 psi. No leakage of pressurizing gas occurs.

The samples are cured at a pressure of about 150 psig for about 15 minutes at about 340 degrees F. When cure is complete, the valve to the pressurizing gas is closed and the vent valve opened until all gases are expelled. The vent valve is then closed, the hose to the mold unhooked, the mold released, and the samples removed.

EXAMPLE 4

Testing of the Cured Samples

Three test strip pieces about two inches wide by 5 inches long are cut from the cured samples along the 5-inch dimension (i.e., parallel to the 3-inch dimension of the Mylar windows) so that each of the three Mylar windows is approximately centered within the 2-inch width of the corresponding test strip. The edges of the test strip pieces are pried open in order to free the ends of the strips which are to be placed in the peel tester jaws.

Each sample is then mounted in an Instron peel tester and peeled at 180 degrees at a jaw separation rate of 2 inches per minute. The 1-inch wide bond section (corresponding with the 1-inch wide window in the Mylar sheet) is peeled and the force in pounds per linear inch is recorded. At room temperature, compositions 1–7 exhibit peel strengths of 33, 36, 220, 36, 215, 350 and 196 pounds per linear inch, respectively. Samples 1, 2 and 4 exhibit adhesive failure (i.e., poor adhesion) and samples 3, 5, 6 and 7 exhibit cohesive failure (i.e., excellent adhesion). Samples 5, 6 and 7 represent compositions having the claimed combination of ground rubber, natural rubber latex and resin emulsion. Samples 1, 2, 3 and 4 represent alternative compositions, e.g., samples 1 (having latex and ground rubber filler, but no resin emulsion), 2 (having resin emulsion and ground rubber filler, but no latex) and 4 (having latex and resin emulsion, but with lampblack instead of ground rubber filler) exhibit poor adhesion, while sample 3 (having latex and resin emulsion, but with no filler at all) possesses no air bleed capabilities.

Also, for samples 3, 5, 6 and 7, a hot peel test is carried out after allowing the samples to age for ½ hour at 250 degrees F. before being mounted in the peel tester. The samples are then peeled hot at about two inches per minute jaw separation rate. Compositions 3, 5, 6 and 7 exhibit hot peel strengths of 150, 182, 221 and 155 pounds per linear inch respectively. All hot peels exhibited cohesive failure.

Cohesive failure is the main indicator of acceptable adhesion performance. Sample 7, which exhibits cohesive failure and has the highest air bleed, over 2.5 times higher than the next highest (sample 5) in this series, is the most prefered composition.

Composition 7 of Example 1 above was subjected to a field trial with the following results:

1. Composition provided unexpectedly excellent cured adhesion without sacrificing air bleed.
2. Exceptional mold characteristics are demonstrated by good finished tire appearance with no blemishes or discolorations.
3. The cured product exhibited no surface defects because the composition provided adequate air bleed together with excellent adhesion.
4. The mold surface contained no residue because of good cured bonding characteristics, tolerance to overapplication and resistance to mold fouling.
5. Absence of voids because the very effective air bleed characteristics prevented trapped air, lights, nonfills, etc.
6. Absence of knit failures due to excellent adhesion and lack of trapped air in tire junctions.
7. Excellent release of the rubber from the mold as a result of outstanding lubricating properties of the composition.

8. Resistance to flex cracking as demonstrated by wheel test evaluations at elevated temperature and ozone levels. The composition of the invention compares favorably against solvent base and water base products in comparative testing.

9. Drying times are reduced to approximately half those of conventional water based compositions.

10. No plugging of spray nozzles.

In addition to the enhanced adhesive properties of the compositions of the invention, far exceeding the sum of adhesive properties any of the components of such compositions might contain, they also provide the air bleed necessary to provide blemish-free products after cure. This combination of highly advantageous properties is unexpected since the adhesive properties of prior water based compositions are markedly reduced or destroyed when sufficient filler is added to provide the required air bleed.

The foregoing comparative examples clearly illustrate this remarkable and unexpected result. As shown in Example 1 composition 1 contains a latex and ground rubber filler, but no resin emulsion, composition 2 contains a resin emulsion and ground rubber filler, but no latex while composition 4 contains a latex and a resin emulsion, but uses lampblack instead of ground rubber filler. All of these compositions exhibit adhesive-type failure indicating poor adhesion, while composition 3 (latex and resin emulsion but no filler at all) possesses no air bleed capabilities. On the other hand, the unexpected benefits of the invention are demonstrated by compositions 5, 6 and 7 which are compositions of the invention and which exhibit cohesive-type failure indicating excellent adhesion, and which have excellent air bleed characteristics.

When used as an adhesive, the compositions of the invention are preferably applied at dry coating weights of from about 0.002 to about 0.01 gram per square inch on the uncured surfaces to be bonded and allowed to dry. They may either be applied to one or both of the surfaces to be bonded. Because the dry coating exhibits no significant tack, the uncured parts should be held in proper alignment prior to and during heating/curing/vulcanization. However, because of the high air bleed characteristics of compositions of the invention, there is no need for a separate step (e.g., knitting) to eliminate air from the junction prior to the curing step since the considerable air bleed of the coating/adhesive composition allows air to escape during curing.

Although the invention has been described in considerable detail in the foregoing, it is to be understood that such detail is solely for the purpose of illustration and that variations may be made by those skilled in the art without departing from the spirit and scope of the invention except as set out in the claims.

What is claimed is:

1. A method for coating a surface of an uncured rubber article which comprises applying on the surface of the uncured rubber article an aqueous mixture containing an aqueous rubber latex, a resin emulsion and vulcanized and/or unvulcanized ground rubber particles having a particle size of from 5 to 400 microns as filler in an amount of from 4 to 60% by weight based on the weight of the composition and thereafter curing the coated rubber article.

2. The method of claim 1 wherein an outside tire surface is coated with the aqueous mixture and thereafter shaped and vulcanized.

3. The method of claim 1 wherein the aqueous mixture contains from about 4 to about 60 weight percent of ground rubber, from about 0.5 to about 15 weight percent of rubber latex, and from about 1 to about 30 weight percent of resin emulsion.

4. The method of claim 3 wherein the aqueous mixture contains from about 15 to about 70% solids.

5. The method of claim 4 where the aqueous mixture contains a thickening agent, surfactant, wetting agent, a biocide/preservative, colorant, tack enhancer, foam control agent, shear stabilizer, sequestering agent, or a mixture of any of them.

6. The method of claim 1 wherein the aqueous mixture contains ground rubber having a particle size of from about 50 to about 200 microns.

7. The method of claim 1, wherein the surface of the rubber article is pretreated with an oxidizing agent or UV radiation.

* * * * *